US008042582B2

(12) United States Patent
Mizuno et al.

(10) Patent No.: US 8,042,582 B2
(45) Date of Patent: Oct. 25, 2011

(54) PNEUMATIC TIRE HAVING CONDUCTIVE LAYER AND RUBBER CEMENT LAYER INCLUDING COMPOUND HAVING OXYETHYLENE UNIT

(75) Inventors: Youichi Mizuno, Kobe (JP); Mamoru Uchida, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 938 days.

(21) Appl. No.: 11/723,677

(22) Filed: Mar. 21, 2007

(65) Prior Publication Data
US 2007/0227636 A1 Oct. 4, 2007

(30) Foreign Application Priority Data

Apr. 4, 2006 (JP) .................................. 2006-103349

(51) Int. Cl.
*B60C 11/00* (2006.01)
*B60C 19/08* (2006.01)
(52) U.S. Cl. .............. 152/152.1; 152/209.5; 152/DIG. 2
(58) Field of Classification Search ............... 152/152.1, 152/DIG. 2, 209.5
See application file for complete search history.

(56) References Cited

U.S. PATENT DOCUMENTS

| 2,339,546 | A | * | 1/1944 | Hanson ....................... 152/152.1 |
| 5,714,533 | A | * | 2/1998 | Hatakeyama et al. ........ 524/140 |
| 5,871,597 | A | * | 2/1999 | Vasseur ...................... 152/209.5 |
| 6,044,882 | A | * | 4/2000 | Crawford et al. .......... 152/152.1 |
| 6,046,266 | A | * | 4/2000 | Sandstrom et al. ........... 524/492 |
| 6,399,692 | B2 | * | 6/2002 | Hogan et al. ................ 152/152.1 |
| 6,520,229 | B1 | * | 2/2003 | Muraoka et al. ............ 152/152.1 |
| 7,528,186 | B2 | * | 5/2009 | Halasa et al. ................. 524/106 |
| 2002/0107317 | A1 | | 8/2002 | Garro et al. |
| 2004/0063812 | A1 | * | 4/2004 | Sohal ............................ 523/200 |
| 2004/0224152 | A1 | * | 11/2004 | Lamoine et al. ............. 428/364 |
| 2005/0103412 | A1 | * | 5/2005 | Zanzig et al. .............. 152/152.1 |
| 2006/0102264 | A1 | * | 5/2006 | Nicolas ...................... 152/152.1 |

(Continued)

FOREIGN PATENT DOCUMENTS
EP 1 621 365 A1 2/2006
(Continued)

OTHER PUBLICATIONS

Machine translation for Japan 10-147668 (no date).*

*Primary Examiner* — Steven D Maki
(74) *Attorney, Agent, or Firm* — Birch, Stewart, Kolasch & Birch, LLP

(57) ABSTRACT

A pneumatic tire is equipped with at least a tread part, a sidewall part, a bead part, and a carcass extending from tread part through sidewall part to bead part, and provided with a breaker part on the outside of carcass in the radial direction of the tire. The volume resistivity of each of a tread rubber, a sidewall rubber, a breaker rubber, and a carcass rubber formed in the tread part, the sidewall part, the breaker part, and the carcass respectively is set to $1\times10^{12}$ Ω·cm or more. A conductive layer having volume resistivity of $1\times10^{11}$ Ω·cm or less is provided between a carcass ply constituting the carcass and the sidewall rubber and has an exposed part to the tire surface. A rubber cement layer contacting with at least a part of the exposed part of the conductive layer and at least a part of the region that becomes a grounding surface in the tread part to the road surface is provided.

4 Claims, 2 Drawing Sheets

U.S. PATENT DOCUMENTS

| | | | |
|---|---|---|---|
| 2007/0000585 A1* | 1/2007 | Uchida et al. | 152/152.1 |
| 2007/0163690 A1* | 7/2007 | Nobuchika et al. | 152/152.1 |
| 2007/0215257 A1* | 9/2007 | Uchida et al. | 152/152.1 |

FOREIGN PATENT DOCUMENTS

| | | | |
|---|---|---|---|
| EP | 1738935 | * | 1/2007 |
| GB | 544757 | * | 4/1942 |
| JP | 8-34204 A | | 2/1996 |
| JP | 8-230407 A | | 9/1996 |
| JP | 10-36559 A | | 2/1998 |
| JP | 10-81783 A | | 3/1998 |
| JP | 10-147668 | * | 6/1998 |
| JP | 10-147668 A | | 6/1998 |
| JP | 11-217011 A | | 8/1999 |
| JP | 2000-190709 A | | 7/2000 |
| JP | 2002-105246 | * | 4/2002 |
| JP | 2004-42858 A | | 2/2004 |

* cited by examiner

PNEUMATIC TIRE HAVING CONDUCTIVE LAYER AND RUBBER CEMENT LAYER INCLUDING COMPOUND HAVING OXYETHYLENE UNIT

This nonprovisional application is based on Japanese Patent Application No. 2006-103349 filed with the Japan Patent Office on Apr. 4, 2006, the entire contents of which are hereby incorporated by reference.

BACKGROUND OF THE INVENTION

1. Field of the Invention

The present invention relates to a pneumatic tire that can reduce an electric resistance and improve the safety in use.

2. Description of the Background Art

In recent years, various methods have been proposed using silica for example in the tread part of a tire, and furthermore also in the breaker part and the sidewall part as other members of the tire in order to reduce the rolling resistance of the tire and to maintain wet grip performance. However, in the case of compounding silica in a large amount, the electric resistance of the tire increases and for example there is a case that a spark due to static electricity is generated and fuel is ignited when fuel is supplied to a vehicle, and there is a problem that safety cannot be assured when used. Therefore, there is demand to supply a tire realizing a reduction of the rolling resistance and maintaining wet grip performance that is capable of preventing the generation of static electricity.

With respect to such a pneumatic tire that can improve the conductivity and prevent a discharge phenomenon caused by accumulation of static electricity in the vehicle body, Japanese Patent Application Laid-Open No. 08-230407 has proposed a pneumatic tire in which: a rubber composition forming a tread section is allowed to contain 50 parts by weight or less of carbon black per 100 parts by weight of rubber component, with a non-carbon black based reinforcing agent being contained therein; a rubber composition forming a sidewall section is allowed to contain 40 parts by weight or less of carbon black per 100 parts by weight of rubber component; conductive thin films are affixed to the tread section and the sidewall section, with the rubber composition forming the conductive thin film having a compounding amount of carbon black of 60% by weight or more per 100 parts by weight of rubber component and being set to 35% by weight or more with respect to the entire rubber composition.

In an attempt to provide a pneumatic tire that can effectively reduce the tire electrical resistance while maintaining a superior wet performance, and also can exert these characteristics stably from the initial state of use to wear limit, Japanese Patent Application Laid-Open No. 2000-190709 has proposed a pneumatic tire in which: a tread rubber, constituted by a main tread rubber section made from an insulating rubber material cross-linked by silica, having a volume resistivity of $1 \times 10^8$ $\Omega \cdot cm$ or more and an outer conductive section that is made from a conductive rubber member having a volume resistivity of less than $1 \times 10^8$ $\Omega \cdot cm$, forms a ground-contacting face together with the main tread section, and starts from the end edge of the ground-contacting face and ends with a distance of 3 to 35% of the ground-contacting width being interposed therebetween from the end edge of the ground-contacting face inward in the tire axial direction, and the outer conductive section, which has a sheet shape with a thickness in a range from 0.01 to 1.0 mm, is exposed to the outer face of the tread containing a groove wall and a groove bottom of a lateral groove, and continues in the tire circumferential direction, and a wing rubber, a sidewall rubber and a clinch rubber are formed by using a conductive rubber material, with the outer conductive section being connected to the wing rubber.

In an attempt to provide a rubber composition for a tire sidewall that has a low rolling resistance, is superior in abrasion resistance and wet performance and provides a tire having a low electrical resistance, Japanese Patent Application Laid-Open No. 10-036559 has proposed a rubber composition for a tire sidewall which is obtained by adding 5 to 50 parts by weight of carbon black having a primary particle size of 20 nm or more, a compression DBP oil absorption of 120 ml/100 g or less and a CTAB surface area of 130 m²/g or less, 10 to 60 parts by weight of precipitation silica having a DBP oil absorption of 200 ml/100 g or more and a BET nitrogen adsorption specific surface area of 180 m²/g or less and silane coupling agent setting to such an amount whose reactive factor is controlled within a specific range, to 100 parts by weight of specific diene-based rubber to be kneaded therein.

In an attempt to prevent a reduction in a conduction-preventive property in a tire tread using silica as a reinforcing agent, Japanese Patent Application Laid-Open No. 08-034204 has proposed a tire tread which is constituted by a strip made from a rubber composition for a tire tread having a high resistivity and extends in a length direction with a predetermined lateral width, and a conductive strip that is placed in the length direction within the lateral width and extended from the surface to the bottom face of the tread strip, and is formed by a low resistivity rubber composition for a tire having a volume resistivity of $10^8$ $\Omega \cdot cm$ or less.

In an attempt to provide a rubber composition for a tire tread capable of preventing static electricity accumulating in the vehicle body, Japanese Patent Application Laid-Open No. 10-147668 has proposed the rubber composition for a tire tread formed by compounding 1.0 to 30 parts by weight of a compound having an oxyethylene unit, 5 to 80 parts by weight of silica, and 0 to 40 parts by weight of carbon black per 100 parts by weight of a rubber constituent consisting of a diene rubber However, in the methods of Patent Documents 1 to 5, there is still enough room for improvement in the respect of highly managing to have low electric resistance and high safety at the same time to a sufficiently satisfactory level.

SUMMARY OF THE INVENTION

The objective of the present invention is to provide a pneumatic tire in which the above-described problems are solved, the generation of static electricity between the road surface and the tire is well prevented, and safety is improved when used by lowering electric resistance.

The present invention is a pneumatic tire comprising at least a tread part, a sidewall part, a bead part, and a carcass extending from the tread part through the sidewall part to the bead part, and provided with a breaker part on the outside of the carcass in the radial direction of the tire, and in which volume resistivity of each of a tread rubber, a sidewall rubber, a breaker rubber, and a carcass rubber formed in the tread part, the sidewall part, the breaker part, and the carcass respectively is set to $1 \times 10^{12}$ $\Omega \cdot cm$ or more, a conductive layer having volume resistivity of $1 \times 10^{11}$ $\Omega \cdot cm$ or less is provided between a carcass ply constituting the carcass and the sidewall rubber and the conductive layer has an exposed part to a tire surface, and a rubber cement layer contacting with at least a part of the exposed part in the conductive layer and at least a part of the region that becomes a grounding surface in the tread part to a road surface is provided.

The present invention also relates to a pneumatic tire in which the thickness of the conductive layer is in the range of 0.2 to 3.0 mm. The present invention also relates to a pneumatic tire in which the conductive layer includes silica.

The present invention also relates to a pneumatic tire in which the conductive layer and a rubber cement layer include 100 parts by mass of a diene rubber and 1 to 30 parts by mass per 100 parts by mass of a diene rubber of a compound having an oxyethylene unit.

The present invention also relates to a pneumatic tire in which the rubber cement layer has a lower volume resistivity than the tread rubber.

In the pneumatic tire in the present invention, by controlling electric resistance of the rubber constituting the tread part, the sidewall part, the breaker part, and the carcass respectively and by providing a conductive layer in which volume resistivity is controlled between a carcass ply and a sidewall and a rubber cement layer, the rolling resistance and electric resistance are reduced, and static electricity between the road surface and the tire is well prevented. Because of this, it becomes possible to obtain a pneumatic tire in which safety is improved when used by lowering electric resistance.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The pneumatic tire in the present invention is a pneumatic tire equipped with at least a tread part, a sidewall part, a bead part, and a carcass extending from the tread part through the sidewall part to the bead part, and provided with a breaker part on the outside of the carcass in the radial direction of the tire. The volume resistivity of each of the tread rubber, the sidewall rubber, the breaker rubber, and the carcass rubber formed in the tread part, the sidewall part, the breaker part, and the carcass respectively is set to $1 \times 10^{12}$ Ω·cm or more. A conductive layer having volume resistivity of $1 \times 10^{11}$ Ω·cm or less is provided between a carcass ply constituting the carcass and the sidewall and has an exposed part to the tire surface. A rubber cement layer contacting with at least a part of the exposed part of the conductive layer and at least a part of the region that becomes a grounding surface in the tread part to the road surface is provided.

Figure 1:
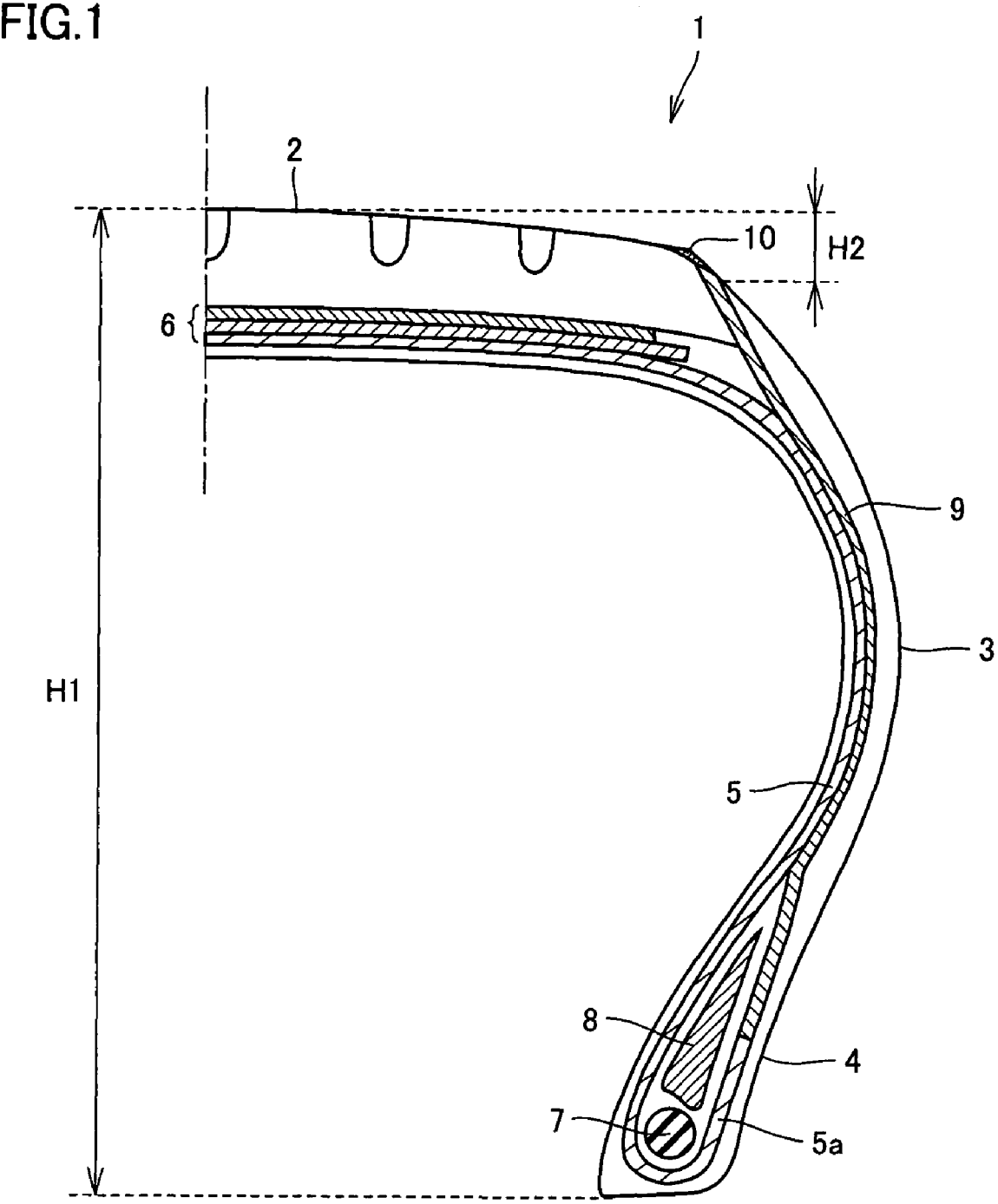
FIG. 1 is a figure exemplifying the right half of a sectional view of the pneumatic tire in the present invention.
Figure 2:
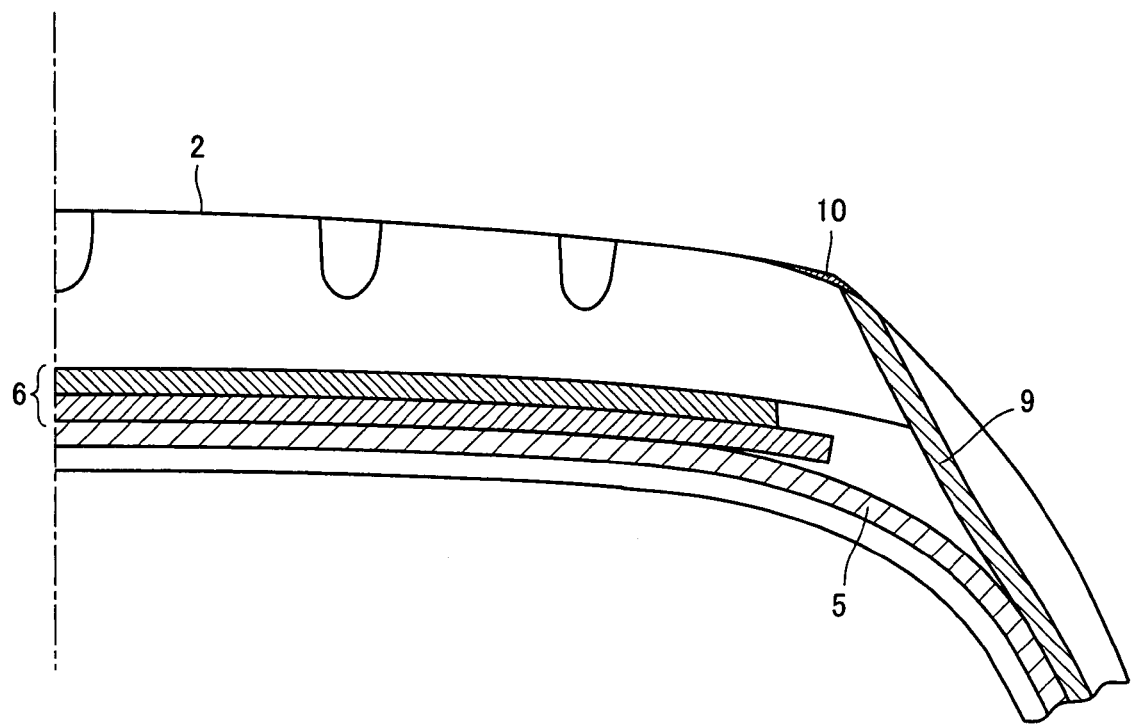
FIG. 2 is an enlarged view of a tread part 2 in a pneumatic tire 1 in the present invention.

The pneumatic tire in the present invention can be used as a tire of various vehicles such as for a passenger car, for a truck and a bus, and for a heavy vehicle. FIG. 1 is a figure exemplifying the right half of a sectional view of the pneumatic tire in the present invention. FIG. 2 is an enlarged view of tread part 2 in pneumatic tire 1 in the present invention. Referring to FIGS. 1 and 2, tire 1 is comprised of tread part 2, a pair of sidewall parts 3 extending inward of the radial direction of the tire from both ends, and a bead part 4 located at the end of each sidewall part 3. Further, a carcass 5 is bridged between bead parts 4 and a breaker layer 6 is placed on the outside of this carcass 5 in the radial direction of the tire. Carcass 5 is formed from one sheet or more of carcass ply arraying a carcass code. This carcass ply passes from tread part 2 through sidewalls 3, is folded back to the outside from the inside in the direction of the tire axis around a bead core 7 of bead part 4 and a bead apex 8 extending to the sidewall direction from the top end of bead core 7, and is locked by a folding part 5a. Breaker layer 6 consists of two sheets or more of ply arraying a breaker code, and the ply is superposed by changing the direction so that each breaker code is crossing between the ply. In the pneumatic tire in the present invention, a conductive layer 9 having an exposed part to the tire surface is provided between the carcass ply constituting carcass 5 and a sidewall rubber constituting sidewall parts 3.

In the pneumatic tire in the present invention, the volume resistivity of each of the tread rubber, the breaker rubber, and the sidewall rubber constituting the tread part 2, the breaker part, and the sidewall part 3 respectively is set to $1 \times 10^{12}$ Ω·cm or more. As long as the volume resistivity is $1 \times 10^{12}$ Ω·cm or more, there is less risk of losing durability and decreasing processability.

In the pneumatic tire in the present invention, conductive layer 9 having a volume resistivity of $1 \times 10^{11}$ Ω·cm or less is provided between the carcass ply and the sidewall rubber, and conductive layer 9 has an exposed part to the tire surface. That is, in the present invention, by maintaining tire performance such as rolling resistance and durability, and by making the volume resistivity of each of the tread rubber, the breaker rubber, and the sidewall rubber $1 \times 10^{12}$ Ω·cm or more, and providing separately conductive layer 9 in which the volume resistivity is set low so that a part of it is exposed to the tire surface, static electricity generated between the grounding surface of the pneumatic tire and the road surface is extinguished at the conductive layer and a discharge phenomenon is prevented. From this, a pneumatic tire can be obtained in which rolling resistance is maintained and safety is improved when used, especially when fuel is supplied, etc.

As long as the volume resistivity of conductive layer 9 is $1 \times 10^{11}$ Ω·cm or less, improvement effect of conductivity of the tire can be obtained to a desired extent. The volume resistivity of conductive layer 9 is $1 \times 10^{11}$ Ω·cm or less, and more preferably $1 \times 10^{9}$ Ω·cm or less. A lower the volume resistivity of the conductive layer is preferable in the respect of the improvement effect of conductivity of the tire. However, the volume resistivity of the conductive layer is set to $1 \times 10^{3}$ Ω·cm or more, and still more preferably $1 \times 10^{4}$ Ω·cm or more from the point of view of preventing a phenomenon in which electric resistance is decreased for example by compounding a large amount of conductive component, electrochemical reaction is accelerated at a part where the tire contacts with the rim, and the rim rusts easily.

Further, the thickness of conductive layer 9 is preferably 0.2 mm or more because the improvement effect of the tire conductivity can be obtained to a desired extent, and preferably 2.0 mm or less because rolling resistance of the tire is not deteriorated largely. The thickness of conductive layer 9 is 0.3 mm or more, more preferably 0.9 mm or more, and still more preferably 1.5 mm or less.

In the above-described rubber cement layer 10 provided in the pneumatic tire in the present invention, as shown in FIG. 1, rubber cement layer 10 can be formed by contacting with at least a part of the exposed part of conductive layer 9 and at least a part of the region that becomes a grounding surface in tread part 2 to the road surface. That is, by providing rubber cement layer 10 in the region including the grounding surface of the tire to the road surface, the exposed part of conductive layer 9 and the region that becomes a grounding surface in tread part 2 to the road surface are made conductive and static electricity generated between the road surface and the tire on the grounding surface of the tread part when running is discharged to conductive layer 9 having a high conductivity through rubber cement layer 10 by providing rubber cement layer 10 in the region including the grounding surface of the tire to the road surface, a discharge phenomenon due to the static electricity is prevented and safety can be improved when used.

Rubber cement layer 10 in the present invention has preferably a lower volume resistivity than the tread rubber. Specifically, the volume resistivity of rubber cement layer 10 is preferably set within the range of $10^8$ Ω·cm to $10^{11}$ Ω·cm.

Rubber cement layer 10 in the present invention is typically formed by steps of: coating a fixed part on the tire surface with rubber cement obtained by mixing a rubber composition to an organic solvent and dissolving a rubber component in the rubber composition into the organic solvent; drying; vulcanizing; and curing. That is, because the rubber cement layer goes through a process in which the rubber component is dried after dissolving into the organic solvent once, the thickness is small comparing with a layer formed as a rubber sheet and the rubber cement has a characteristic that the problem due to wear of a tire tread surface is not generated because of the rubber cement layer wearing when the tire is running.

Moreover, the organic solvent used in the formation of rubber cement 10 is preferably an organic solvent that becomes a good solvent of the rubber component included in the rubber composition for the rubber cement layer, and examples include hexane, heptane, petroleum ether, tetrahydrofuran and cyclohexane.

In conductive layer 9 and rubber cement layer 10, a material such as silica, aluminum, and clay is preferably used as a filler. Conductive layer 9 and rubber cement layer 10 preferably includes silica especially. The amount of the silica is preferably 50% by mass or more in the filler in which silica is included. In the case that silica makes up 50% by mass in the filler, the effect of reducing rolling resistance of the tire is good. The percentage of silica making up the filler is 70% by mass or more, and more preferably 90% by mass. In the present invention, the entire amount of the above-described filler may be silica. However, it is also preferable that for example the percentage of silica making up the filler is 70% by mass or less and furthermore 50% by mass or less, and a filler such as aluminum and clay makes up the remaining part in order to adjust conductivity and mechanical strength.

Silica can be compounded for example at 5 parts by mass to 100 parts by mass per 100 parts by mass of the rubber component in conductive layer 9 and rubber cement layer 10. Silica used generally in a general-purpose rubber can be used as the silica, and examples includes a dry-method white carbon, a wet-method white carbon, and colloidal silica, as a reinforcing agent. Among these, a wet-method white carbon having hydrous silicic acid as a main component is preferable. In the case that the compounding amount of silica is 5 parts by mass or more, wear resistance of the tire is good, and in the case that it is 100 parts by mass or less, the lowering of the processability due to an increase in viscosity of the unvulcanized rubber composition when manufacturing the tread rubber, the breaker rubber, and the sidewall rubber and an excessive increase of cost can be prevented well.

Nitrogen absorption specific surface area of the silica used in above-described (BET method), for example, is 50 to 300 m$^2$/g, and furthermore preferably in the range of 100 to 200 m$^2$/g. In the case that the nitrogen absorption specific surface area of the silica is 50 m$^2$/g or more, wear resistance of the tire is improved well because the effect of reinforcement to the rubber composition for a tire can be obtained sufficiently. On the other hand, in the case that the nitrogen absorption specific surface area is 300 m$^2$/g or less, processability of the rubber composition for a tire is good and maneuvering stability is also secured sufficiently. Here, the nitrogen absorption specific surface area is a value measured with a BET method according to ASTM D3037-81.

Conductive layer 9 and rubber cement layer 10 provided in the tire in the present invention preferably include 100 parts by mass of a diene rubber and 1 to 30 parts by mass per 100 parts by mass of a diene rubber of a compound having an oxyethylene unit. The oxyethylene unit is used as a conductive material in place of carbon. In the case that the compound having the oxyethylene unit of 1 part by mass or more per 100 parts by mass of a diene rubber is compounded, because an ether part of which the compound having the oxyethylene unit has is hydrophilic, the surface of the tread part of the obtained tire becomes hydrophilic. Then, water on the road and moisture in air are absorbed on the hydrophilic surface, static electricity can be discharged to the road or air, and as a result, accumulation of static electricity in the vehicle can be prevented. Further, in the case that it is 30 parts by mass or less per 100 parts by mass of a diene rubber, it is preferable in the respect that a balance of decrease of electric resistance and the reinforcing property is good. The compounding amount of the compound having the oxyethylene unit per 100 parts by mass of a diene rubber is preferably 1 to 20 parts by mass, and more preferably 1 to 10 parts by mass.

Moreover, the compound having the oxyethylene unit has an oxyethylene unit in its main chain, termini, and/or a side chain. The oxyethylene unit is represented with Formula 1: —O—(CH$_2$—CH$_2$—O)$_n$—H. In Formula 1, n represents an integer of 1 or more.

In the compound having the oxyethylene unit used in the present invention, examples of the compound having the oxyethylene unit in the main chain include polyoxyethylene alkyl ether, polyoxyethylene alkylphenyl ether, monoethylene glycol, diethylene glycol, triethylene glycol, polyethylene sorbitan fatty acid ester, polyoxypropylene alkyl ether, polyoxyethylene alkyl amine, polyoxystyrene alkyl ether, and polyoxyethylene alkyl amides.

Further, examples on the market of the compound having the oxyethylene unit in the main chain or the terminus including Rikemarl A-23 (main chain is phenylethylene, one oxyethylene unit per 9 carbon atoms constituting the main chain, n=8) and Rikemarl B-205 (main chain is ethylene, one oxyethylene unit per 12 carbon atoms constituting the main chain, n=5) manufactured by Riken Vitamin Co., Ltd. can be preferably used.

The compound having the oxyethylene-unit preferably has an oxyethylene unit at least in the main chain. It is because surface characteristic of the tire such as the sustaining property of the effect of preventing the accumulation of static electricity and decreasing electric resistance is improved when the oxyethylene unit is grafted onto polyethylene, etc.

Further, the compound having the oxyethylene unit at least in the side chain preferably has 4 to 12 oxyethylene units per 100 carbon atoms constituting the main chain. By using the compound with 4 oxyethylene units or more, electric resistance can be decreased more. By using the compound with 12 oxyethylene units or less, solubility with the rubber component and the reinforcing property are improved more. Moreover, in this case, it is preferable to used polyethylene, polypropylene, etc. mainly as the main chain.

An example on the market of the compound having the oxyethylene unit at least in the side chain including Sumiade 300G (main chain is ethylene, 6 oxyethylene units per 100 carbon atoms constituting the main chain, n=10) manufactured by Sumitomo Chemical Co., Ltd. can be preferably used.

Moreover, the compound having the oxyethylene unit at least in the main chain may have the oxyethylene unit also in the main chain and/or the end of the chain.

Further, a filler besides the above-described such as carbon black may be compounded in conductive layer 9 and rubber cement layer 10 from the point of view of giving a good conductivity.

Conductive layer 9, rubber cement layer 10, tread part 2, the breaker part, and sidewall part 3 in the pneumatic tire in the present invention can be constituted from for example the rubber composition in which the component as described below is compounded. The rubber component includes a natural rubber (NR), an epoxidized natural rubber, and diene synthetic rubber. The diene synthetic rubber includes a styrene-butadiene rubber (SBR), a polybutadiene rubber (BR), a polyisoprene rubber (IR), an ethylene-propylene-diene rubber (EPDM), a chloroprene rubber (CR), acrylonitrile-propylene-diene rubber (NBR), and a butyl rubber (IIR), and a rubber component including one kind or two kinds or more of these is preferable. Moreover, the ethylene-propylene-diene rubber (EPDM) is a rubber including a third diene component in the ethylene-propylene rubber (EPM). Here, an example of the third diene component is a nonconjugated diene having 5 to 20 carbon atoms, and preferable examples include 1,4-pentadiene, 1,4-hexadiene, 1,5-hexadine, 2,5-dimethyl-1,5-hexadiene, 1,4-octadiene, a cyclic diene such as 1,4-cyclohexadiene, cyclooctadiene, and dicyclopentadiene, and an alkenyl norbornene such as 5-ethyliden-2-norbornene, 5-butyliden-2-norbornene, 2-methallyl-5-norbornene, and 2-isopropenyl-5-norbornene. Especially, dicyclopentadiene, 5-ethyliden-2-norbornen, etc. can be used preferably.

The rubber component used in the conductive layer is preferably a diene rubber, and among these, a natural rubber (NR), a styrene-butadiene rubber (SBR), a polybutadiene rubber (BR), a polyisoprene rubber (IR), an epoxidized natural rubber (ENR), etc. are especially preferable.

Further, preferable examples of the rubber component used in the rubber cement layer include a natural rubber (NR), a styrene-butadiene rubber (SBR), a polybutadiene rubber (BR), a polyisoprene rubber (IR), and an epoxidized natural rubber (ENR).

In the above-described rubber composition, the following component that is generally compounded in other rubber products can be compounded appropriately.

In the case of compounding silica to the rubber composition in the present invention, it is preferable to compound a silane based coupling agent, preferably a sulfur-containing silane coupling agent, of 1% by mass to 20% by mass to a mass of silica for example. By compounding the silane coupling agent, wear resistance and: maneuvering stability of the tire can be improved, and in the case that the compounding amount of the silane coupling agent is 1% by mass or more, the effect of improving wear resistance and maneuvering stability can be obtained well. Further, in the case that the compounding amount of the silane coupling agent is 20% by mass or less, there is less danger of generating burn (scorching) in the kneading and extruding process of the rubber. Examples of the sulfur-containing silane coupling gent include 3-trimethoxysilylpropyl-N, N-dimethylthiocarbamoyl-tetrasulfide, trimethoxysilylpropyl-mercaptobenzothiazole tetrasulfide, triethoxysilylpropyl-methacrylate-monosulfide, dimethoxymethylsilylpropyl-N, N-dimethylthiocarbamoyl-tetrasulfide, bis-[3-(triethoxysilyl)-propyl]tetrasulfide, and 3-mercaptopropyltrimethoxysilane.

Vinyltrichlorosilane, vinyltris(2-methoxyethoxy)silane, γ-glycidoxypropyltrimethoxysilane, γ-methacryloxypropyltrimethoxysilane, γ-(2-aminoethyl)aminopropyltrimethoxysilane, γ-chloropropyltrimethoxysilane, γ-aminopropyltriethoxysilane, etc. can be used as other silane based coupling agents.

In the present invention, other coupling agents, for example an aluminate-based coupling agent or a titanium-based coupling agent are possibly used independently or together with a silane-based coupling agent.

Additionally, in the rubber composition, a filler such as carbon black, clay, alumina, talc, calcium carbonate, magnesium carbonate, aluminum hydroxide, magnesium hydroxide, magnesium oxide, and titanium oxide can be used independently or by mixing two kinds or more.

Here, carbon black is compounded preferably at 10 parts by mass to 150 parts by mass per 100 parts by mass of rubber composition. Here, carbon black having the material properties of which the nitrogen absorption specific surface area (BET method) is in the range of 70 to 300 $m^2/g$, DBP oil absorption is in the range of 5 to 300 ml/100 g, and the iodine absorption amount is in the range of 146 to 152 mg/g, is preferable in the respect of the effect of reinforcement to the rubber composition for a tire.

Other than the above-described, a vulcanizing agent, a vulcanization accelerator, a softening agent, a plasticizer, an antioxidant, a foaming agent, and a scorch preventing agent, etc. are possibly added to the rubber composition.

An organic peroxide or a sulfur-based vulcanizing agent can be used as the vulcanizing agent. Examples of the organic peroxide can be used include benzoyl peroxide, dicumyl peroxide, di-t-butyl peroxide, t-butylcumyl peroxide, methylethylketone peroxide, cumene hydroperoxide, 2,5-dimethyl-2,5-di(t-butylperoxy)hexane, 2,5-dimethyl-2,5-di(benzoylperoxy)hexane, 2,5-dimethyl2,5-di(t-butylperoxy)hexine-3 or 1,3-bis(t-butylperoxypropyl)benzene, di-t-butylperoxy-diisopropylbenzene, t-butylperoxybenzene, 2,4-dichlorobenzoyl peroxide, 1,1-di-t-butylperoxy-3,3,5-trimethylsiloxane, and n-butyl-4,4-di-t-butylperoxyvalerate. Among these, dicumyl peroxide, t-butylperoxybenzene, and di-t-butylperoxy-diisopropylbenzene are preferable. Further, examples of the sulfur-based vulcanizing agent that can be used include sulfur and morpholine disulfide. Among these, sulfur is preferable.

The vulcanization accelerator including at least one of a sulfenamide-based, a thiazole-based, a thiuram-based, a thiourea-based, guanidine-based, dithiocarbamic acid-based, an aldehyde-amine based or an aldehyde-ammonia based, an imidazoline-based, or a xanthate-based vulcanization accelerator can be possibly used.

Each amine-based, phenol-based, and imidazole-based compound, metal carbamate, wax, etc. is possibly selected appropriately and used as the antioxidant.

In the present invention, the softening agent may be used together in order to improve kneadability more. The softening agent includes a petroleum-based softening agent such as process oil, lubricating oil, paraffin, fluidized paraffin, petroleum asphalt, and vaseline, a fatty oil based softening agent such as castor oil, linseed oil, rapeseed oil, and palm oil, waxes such as tall oil, sab, beeswax, carnauba wax, and lanoline, and fatty acid such as linoleic acid, palmitic acid, stearic acid, and lauric acid.

The plasticizer includes DMP (dimethyl phthalate), DEP (diethyl phthalate), DBP (dibutylphthalate), DHP (diheptyl phthalate), DOP (dioctyl phthalate), DINP (diisononyl phthalate), DIDP (diisodecyl phthalate), BBP (butylbenzyl phthalate), DLP (dilauryl phthalate), DCHP (dicyclohexyl phthalate), anhydrous hydrophthalate ester, DOZ (di-2-ethylhexyl azelate), DBS (dibutyl sebacate), DOS (dioctyl sebacate), acetyltriethyl citrate, acetyltributyl citrate, DBM (dibutyl maleate), DOM (2-ethyhexyl maleate), and DBF (dibutyl fumarate).

Examples of the scorch preventing agent in order to prevent or retard scorch that can be used include organic acids such as phthalic anhydride, salicylic acid, and benzoic acid, a nitroso compound such as N-nitrosodiphenylamine, and N-cyclohexylthiophthalimide.

EXAMPLES

The present invention is explained in detail by giving examples below. However, the present invention is not limited to these.

<Preparation of the Rubber Composition for the Conductive Layer>

After kneading the components except for sulfur and a vulcanization accelerator in the compounding components shown in Table 1 using a seal type Banbury mixer at 150° C. for 5 minutes, sulfur and the vulcanization accelerator were added and mixed more at 80° C. for 5 minutes using a biaxial open roll, and the rubber compositions A to G for the conductive layer were prepared through a extrusion process and a calendar process with the usual method.

<Preparation of the Rubber Composition for the Rubber Cement Layer>

After kneading the components except for sulfur and a vulcanization accelerator in the compounding components shown in Table 2 using a seal type Banbury mixer at 150° C. for 5 minutes, sulfur and the vulcanization accelerator were added and mixed more at 80° C. for 5 minutes using a biaxial open roll, and the rubber composition H for the rubber cement layer was prepared through a extrusion process and a calendar process with the usual method.

<Preparation of the Rubber Composition for the Tread Part>

After kneading the components except for sulfur and a vulcanization accelerator in the compounding components shown in Table 3 using a seal type Banbury mixer at 150° C. for 5 minutes, sulfur and the vulcanization accelerator were added and mixed more at 80° C. for 5 minutes using a biaxial open roll, and the rubber compositions I-1 and I-2 for the rubber cement layer were prepared through a extrusion process and a calendar process with the usual method.

<Preparation of the Rubber Composition for the Sidewall Part>

After kneading the components except for sulfur and a vulcanization accelerator in the compounding components shown in Table 4 using a seal type Banbury mixer at 150° C. for 5 minutes, sulfur and the vulcanization accelerator were added and mixed more at 80° C. for 5 minutes using a biaxial open roll, and the rubber composition J for the sidewall part was prepared through a extrusion process and a calendar process with the usual method.

<Preparation of the Rubber Composition for the Breaker Part>

After kneading the components except for sulfur and a vulcanization accelerator in the compounding components shown in Table 5 using a seal type Banbury mixer at 150° C. for 5 minutes, sulfur and the vulcanization accelerator were added and mixed more at 80° C. for 5 minutes using a biaxial open roll, and the rubber composition K for the breaker part was prepared through a extrusion process and a calendar process with the usual method.

<Preparation of the Rubber Composition for the Carcass>

After kneading the components except for sulfur and a vulcanization accelerator in the compounding components shown in Table 6 using a seal type Banbury mixer at 150° C. for 5 minutes, sulfur and the vulcanization accelerator were added and mixed more at 80° C. for 5 minutes using a biaxial open roll, and the rubber composition L for the carcass was prepared through a extrusion process and a calendar process with the usual method.

<Measurement of Volume Resistivity of the Rubber Composition>

Test pieces of 15 cm squares and 2 mm thickness were made from the obtained rubber compositions A to L, and the volume resistivity of the rubber compositions A to L were measured using an electric resistance meter R8340A manufactured by Advantest Corporation with a condition of voltage at 500 V, temperature at 25° C., and humidity at 50%. The results are shown in Tables 1 to 6. Moreover, in Tables 1 to 6, the greater the value is, the higher the electric resistance of the rubber composition becomes.

TABLE 1

| RUBBER COMPOSITION FOR CONDUCTIVE LAYER | | RUBBER COMPOSITION A | RUBBER COMPOSITION B | RUBBER COMPOSITION C | RUBBER COMPOSITION D | RUBBER COMPOSITION E | RUBBER COMPOSITION F | RUBBER COMPOSITION G |
|---|---|---|---|---|---|---|---|---|
| COMPOUND (PART BY MASS) | NATURAL RUBBER[note 1] | 60 | 60 | 60 | 60 | 60 | 60 | 60 |
| | BUTADIENE RUBBER[note 2] | 40 | 40 | 40 | 40 | 40 | 40 | 40 |
| | STYRENE-BUTADIENE RUBBER[note 3] | — | — | — | — | — | — | — |
| | CARBON BLACK[note 4] | 45 | — | — | — | — | — | — |
| | SILICA[note 5] | — | 50 | 50 | 50 | 50 | 50 | 50 |
| | OXYETHYLENE UNIT OXIDE[note 6] | 0 | 0 | 2 | 5 | 10 | 30 | 1.6 |
| | SILANE COUPLING AGENT[note 7] | — | 4 | 4 | 4 | 4 | 4 | 4 |
| | WAX[note 8] | 1 | 1 | 1 | 1 | 1 | 1 | 1 |
| | ANTIOXIDANT[note 9] | 3 | 3 | 3 | 3 | 3 | 3 | 3 |
| | STEARIC ACID[note 10] | 1 | 1 | 1 | 1 | 1 | 1 | 1 |
| | ZINC WHITE[note 11] | 3 | 3 | 3 | 3 | 3 | 3 | 3 |
| | SULFUR[note 12] | 2 | 2 | 2 | 2 | 2 | 2 | 2 |
| | VULCANIZATION ACCELERATOR[note 13] | 1 | 1 | 1 | 1 | 1 | 1 | 1 |
| VOLUME RESISTIVITY (log Ω · cm) | | 8.0 | 12.5 | 10.8 | 10.3 | 8.4 | 7.8 | 11.0 |

TABLE 2

| RUBBER COMPOSITION FOR RUBBER CEMENT LAYER | | RUBBER COMPOSITION H |
|---|---|---|
| COMPOUND (PART BY MASS) | NATURAL RUBBER(note 1) | 60 |
| | BUTADIENE RUBBER(note 2) | 40 |
| | STYRENE-BUTADIENE RUBBER(note 3) | — |
| | CARBON BLACK(note 4) | — |
| | SILICA(note 5) | 50 |
| | OXYETHYLENE UNIT OXIDE(note 6) | 10 |
| | SILANE COUPLING AGENT(note 7) | 4 |
| | WAX(note 8) | 1 |
| | ANTIOXIDANT(note 9) | 3 |
| | STEARIC ACID(note 10) | 1 |
| | ZINC WHITE(note 11) | 3 |
| | SULFUR(note 12) | 2 |
| | VULCANIZATION ACCELERATOR 1(note 13) | 1 |
| | HEXANE | 800 |
| VOLUME RESISTIVITY (log Ω·cm) | | 11.0 |

TABLE 3

| RUBBER COMPOSITION FOR TREAD PART | | RUBBER COMPOSITION I-1 | RUBBER COMPOSITION I-2 |
|---|---|---|---|
| COMPOUND (PART BY MASS) | NATURAL RUBBER(note 1) | 30 | 30 |
| | BUTADIENE RUBBER(note 2) | — | — |
| | STYRENE-BUTADIENE RUBBER(note 3) | 70 | 70 |
| | CARBON BLACK(note 4) | — | 35 |
| | SILICA(note 5) | 70 | 50 |
| | OXYETHYLENE UNIT OXIDE(note 6) | — | — |
| | SILANE COUPLING AGENT(note 7) | 5.6 | 4.0 |
| | WAX(note 8) | 1 | 1 |
| | ANTIOXIDANT(note 9) | 3 | 3 |
| | STEARIC ACID(note 10) | 1 | 1 |
| | ZINC WHITE(note 11) | 3 | 3 |
| | SULFUR(note 12) | 2 | 2 |
| | VULCANIZATION ACCELERATOR 1(note 13) | 1 | 1 |
| VOLUME RESISTIVITY (log Ω·cm) | | 12.2 | 10.8 |

TABLE 4

| RUBBER COMPOSITION FOR SIDEWALL PART | | RUBBER COMPOSITION J |
|---|---|---|
| COMPOUND (PART BY MASS) | NATURAL RUBBER(note 1) | 40 |
| | BUTADIENE RUBBER(note 2) | 60 |
| | STYRENE-BUTADIENE RUBBER(note 3) | — |
| | CARBON BLACK(note 4) | — |
| | SILICA(note 5) | 40 |
| | OXYETHYLENE UNIT OXIDE(note 6) | — |
| | SILANE COUPLING AGENT(note 7) | 3.2 |
| | WAX(note 8) | 1 |
| | ANTIOXIDANT(note 9) | 3 |
| | STEARIC ACID(note 10) | 1 |
| | ZINC WHITE(note 11) | 3 |
| | SULFUR(note 12) | 1.5 |
| | VULCANIZATION ACCELERATOR 1(note 13) | 1 |
| VOLUME RESISTIVITY (log Ω·cm) | | 12.3 |

TABLE 5

| RUBBER COMPOSITION FOR BREAKER PART | | RUBBER COMPOSITION K |
|---|---|---|
| COMPOUND (PART BY MASS) | NATURAL RUBBER(note 1) | 100 |
| | BUTADIENE RUBBER(note 2) | — |
| | STYRENE-BUTADIENE RUBBER(note 3) | — |
| | CARBON BLACK(note 4) | — |
| | SILICA(note 5) | 60 |
| | OXYETHYLENE UNIT OXIDE(note 6) | — |
| | SILANE COUPLING AGENT(note 7) | 4.8 |
| | WAX(note 8) | — |
| | ANTIOXIDANT(note 9) | 2 |
| | STEARIC ACID(note 10) | 1 |
| | ZINC WHITE(note 11) | 10 |
| | SULFUR(note 12) | 5 |
| | VULCANIZATION ACCELERATOR(note 13) | 1 |
| VOLUME RESISTIVITY (log Ω·cm) | | 12.1 |

TABLE 6

| RUBBER COMPOSITION FOR CARCASS | | RUBBER COMPOSITION L |
|---|---|---|
| COMPOUND (PART BY MASS) | NATURAL RUBBER(note 1) | 100 |
| | BUTADIENE RUBBER(note 2) | — |
| | STYRENE-BUTADIENE RUBBER(note 3) | — |
| | CARBON BLACK(note 4) | — |
| | SILICA(note 5) | 60 |
| | OXYETHYLENE UNIT OXIDE(note 6) | — |
| | SILANE COUPLING AGENT(note 7) | 4.8 |
| | WAX(note 8) | — |
| | ANTIOXIDANT(note 9) | 2 |
| | STEARIC ACID(note 10) | 1 |
| | ZINC WHITE(note 11) | 10 |
| | SULFUR(note 12) | 5 |

TABLE 6-continued

| RUBBER COMPOSITION FOR CARCASS | RUBBER COMPOSITION L |
|---|---|
| VULCANIZATION ACCELERATOR[note 13] | 1 |
| VOLUME RESISTIVITY (log Ω · cm) | 12.0 |

[note 1] The natural rubber is trade name "TSR20" made in Thailand.
[note 2] The butadiene rubber is trade name "BR150B" manufactured by Ube Industries, Ltd.
[note 3] The styrene-butadiene rubber is trade name "SBR1502" manufactured by Sumitomo Chemical Co., Ltd.
[note 4] The carbon black is trade name "Showblack N220" manufactured by CABOT JAPAN K.K.
[note 5] The silica is trade name "Ultrasil VN3" manufactured by Degussa GmbH.
[note 6] The oxyethylene unit oxide is "Sumigard" manufactured by Sumitomo Chemical Co., Ltd.
[note 7] The silane coupling agent is trade name "Si266" manufactured by Degussa GmbH.
[note 8] The wax is trade name "Sunnoc N" manufactured by Ouchi Shinko Chemical Industrial Co., Ltd.
[note 9] The antioxidant is trade name "Ozonone 6C" manufactured by Seiko Chemical Co., Ltd.
[note 10] The stearic acid is trade name "Stearic acid Kiri" manufactured by Nippon Yushi.
[note 11] The zinc white is trade name "Ginrei R" manufactured by Toho Zinc Co., Ltd.
[note 12] The sulfur is trade name "Sulfur" manufactured by Tsurumi Chemical Industry Co., Ltd.
[note 13] The vulcanization accelerator is trade name "Nocceler NS (N-tert-butyl-2-benzothiazolylsulfenamide)" manufactured by Ouchi Shinko Chemical Industrial Co., Ltd.

Examples 1 to 6 and Comparative Examples 1 to 5

The rubber composition manufactured above was used at each combination shown in Tables 7 and 8 and applied to the tread part, the sidewall part, the breaker part, the carcass, the conductive layer, and the rubber cement layer, vulcanization and molding were performed with the normal method, and a pneumatic tire of size 195/65R15 having a structure shown in FIG. 1 was manufactured. Moreover, in the pneumatic tires in Examples 1 to 6 and Comparative Examples 1 to 5, the sidewall part was formed so that the height H2/height H1×100(%) became 5%.

TABLE 7

| | EXAMPLE 1 | EXAMPLE 2 | EXAMPLE 3 | EXAMPLE 4 | EXAMPLE 5 | EXAMPLE 6 |
|---|---|---|---|---|---|---|
| RUBBER COMPOSITION FOR TREAD PART | I-1 | I-1 | I-1 | I-1 | I-1 | I-1 |
| RUBBER COMPOSITION FOR SIDEWALL PART | J | J | J | J | J | J |
| RUBBER COMPOSITION FOR BREAKER PART | K | K | K | K | K | K |
| RUBBER COMPOSITION FOR CARCASS | L | L | L | L | L | L |
| RUBBER COMPOSITION FOR CONDUCTIVE LAYER | C | D | E | F | A | G |
| RUBBER COMPOSITION FOR RUBBER CEMENT LAYER | H | H | H | H | H | H |
| TIRE CONDUCTIVITY (log Ω · cm) | 8.0 | 7.5 | 7.1 | 6.5 | 7.1 | 8.0 |

TABLE 8

| | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|
| RUBBER COMPOSITION FOR TREAD PART | I-1 | I-1 | I-1 | I-1 | I-2 |
| RUBBER COMPOSITION FOR SIDEWALL PART | J | J | J | J | J |
| RUBBER COMPOSITION FOR BREAKER PART | K | K | K | K | K |
| RUBBER COMPOSITION FOR CARCASS | L | L | L | L | L |
| RUBBER COMPOSITION FOR CONDUCTIVE LAYER | A | — | B | E | C |
| RUBBER COMPOSITION FOR RUBBER CEMENT LAYER | — | H | H | — | H |
| TIRE CONDUCTIVITY (log Ω · cm) | 12.1 | 12.4 | 12.3 | 12.1 | 12.2 |

<Tire Conductivity>

The pneumatic tire manufactured above is mounted on a regular rim made from steel, filled with air pressure 2.0 kg/cm$^3$, the tread part is grounded to a conductor plate made from steel at load 450 kg, the electric resistance value between the center part of the tire rim and the conductor plate where the tire is grounded was measured with a condition of applied voltage at 500 V, temperature at 25° C., and humidity at 50%. The result is shown in Tables 7 and 8.

From the result shown in Table 8, in Comparative Example 2 in which a conductive layer is not provided, it is found that tire conductivity cannot be reduced. Further, even in the case that the conductive layer is provided, in Comparative Example 3 in which a rubber composition B where volume specific resistivity is not reduced sufficiently is used as the conductive layer, it is found that reduction of the tire resistivity cannot be realized. Further, in Comparative Examples 1 and 4 in which a rubber cement layer is not provided, it is found that the tire conductivity cannot be reduced. Further, in Comparative Example 5 in which a rubber composition I-2 where volume specific resistivity of the tread part is not more than 1×10$^{12}$ Ω·cm, it is found that reduction of the tire resistivity cannot be realized.

Contrary to this, in Examples 1 to 6 which equipped with the conductive layer having a volume specific resistivity of 1×10$^{11}$ Ω·cm or less and the rubber cement layer, the tire conductivity (log Ω·cm) becomes as low as 8.0 or less (electric resistance value is 1×10$^8$ Ω·cm or less) and it is found that the pneumatic tire in the present invention is superior in conductivity.

The pneumatic tire in the present invention in which the generation of static electricity between the road surface and the tire is prevented without largely increasing the rolling resistance can be preferably applied to various vehicles for example such as a passenger car, a truck, a bus, and a heavy machine.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A pneumatic tire equipped with at least a tread part, a sidewall part, a bead part, and a carcass extending from said tread part through said sidewall part to said bead part, and provided with a breaker part on the outside of said carcass in the radial direction of the tire,
    wherein volume resistivity of each of a tread rubber, a sidewall rubber, a breaker rubber, and a carcass rubber formed in said tread part, said sidewall part, said breaker part, and said carcass respectively is set to 1×10$^{12}$ Ω·cm or more,
    a conductive layer having volume resistivity of 1×10$^{11}$ Ω·cm or less is provided between a carcass ply constituting said carcass and said sidewall rubber,
    said conductive layer has an exposed part to the tire surface,
    a rubber cement layer contacting with at least a part of said exposed part of said conductive layer and at least a part of the region that becomes a grounding surface in said tread part to the road surface is provided, wherein said conductive layer and said rubber cement layer include 100 parts by mass of a diene rubber and 1 to 30 parts by mass per 100 parts by mass of the diene rubber of a compound having an oxyethylene unit,
    said conductive layer includes a filler, and
    said filler includes 50% by mass or more of silica.

2. The pneumatic tire according to claim 1, wherein the thickness of said conductive layer is in the range of 0.2 to 3.0 mm.

3. The pneumatic tire according to claim 1, wherein said conductive layer includes silica compounded at 50 parts by mass to 100 parts by mass per 100 parts by mass of rubber component in the conductive layer.

4. Pneumatic tire according to claim 1, wherein said rubber cement layer has a lower volume resistivity than said tread rubber.

* * * * *